United States Patent [19]

Galtier et al.

[11] Patent Number: 4,986,568

[45] Date of Patent: Jan. 22, 1991

[54] VEHICLE SUSPENSION WITH VARIABLE DAMPING

[75] Inventors: Lucien Galtier, Morsang Sur Orge; Andre Barthelemy, Saint-Remy-Les-Chevreuse; Roger Herbreteau, Voulogne, all of France

[73] Assignee: Automobiles Peugeot and Automobiles Citroen, Neuilly sur Seine, France

[21] Appl. No.: 517,387

[22] Filed: Apr. 30, 1990

Related U.S. Application Data

[63] Continuation of Ser. No. 288,144, Dec. 22, 1988, abandoned.

[30] Foreign Application Priority Data

Dec. 22, 1987 [FR] France ................................ 87-18497

[51] Int. Cl.$^5$ ............................................. B60G 11/26
[52] U.S. Cl. ..................................... 280/707; 280/772; 280/723; 280/689
[58] Field of Search ................ 280/772, 689, 707, 723

[56] References Cited

U.S. PATENT DOCUMENTS 4,436,318  3/1984  Ichikawa et al. .................... 280/707
4,647,069  3/1987  Iijima ................................. 280/707

FOREIGN PATENT DOCUMENTS 218120      4/1987  European Pat. Off. .
3323026-A1  1/1985  Fed. Rep. of Germany .
1094986     5/1955  France .
57-144112   9/1982  Japan .
2028513A    3/1983  United Kingdom .
2161894A    1/1986  United Kingdom .

*Primary Examiner*—Kenneth R. Rice
*Attorney, Agent, or Firm*—Brisebois & Kruger

[57] ABSTRACT

A suspension with variable damping or variable shock absorbing which permits varying the damping as a function of various parameters such as the speed, the height, or steering angle of the wheels. An anti-inclination or stabilizer bar is connected to the suspension arms of the wheels and to the detector for detecting the height of the front axles. The detector provides an electrical signal corresponding to the angle of rotation of the center of the stabilizer bar to an electronic calculator. When the signal exceeds a predetermined threshold value, the calculator transmits information to actuators to change the suspension damping or stiffness. The detector includes a casing mounted on the chassis and having a lever arm driven in rotation by a linkage connected to a lever rigidly attached to the center of the stabilizer bar.

3 Claims, 1 Drawing Sheet

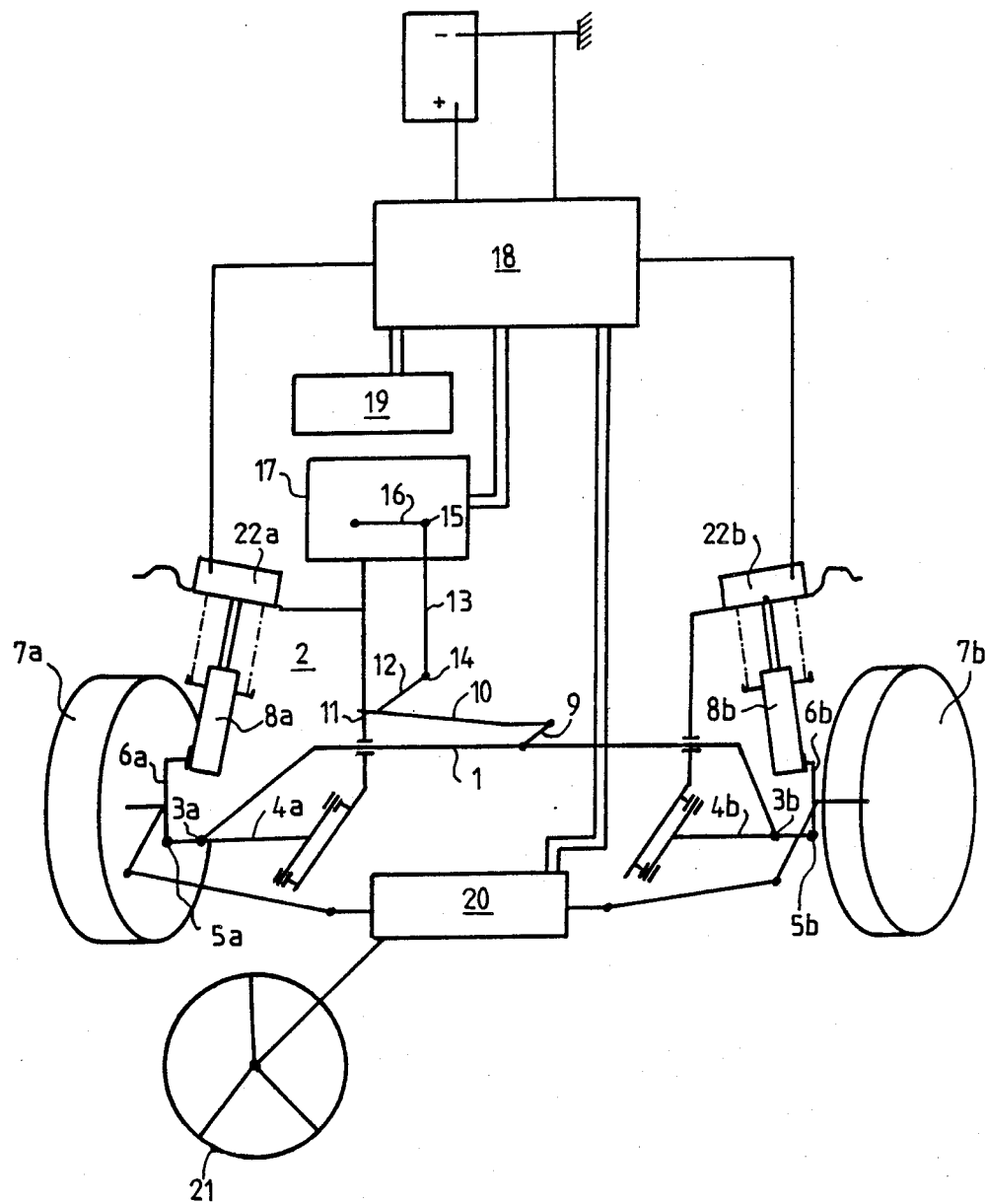

VEHICLE SUSPENSION WITH VARIABLE DAMPING

This is a continuation of application Ser. No. 288,144, filed Dec. 22, 1988, and now abandoned.

In a with a variable damping or variable shock absorbing suspension, it is necessary to detect with precision the pumping or wheel deflection movements to improve comfort and road holding qualities while traveling in a straight line with high undulations, bumps, or isolated holes.

The means of detection do not take into account either the rolling movements of the chassis or the deflection movements of each wheel taken individually.

SUMMARY OF THE INVENTION

The present invention has as an object a suspension with variable damping or variable shock absorbing which permits varying the damping as a function of various parameters such as the speed or steering angle of the wheels, comprising an anti-inclination or stabilizer bar connected to the suspension arms of the wheels and to the means for detecting the height of the front axle, and responding to conditions indicating more height.

This suspension is characterized in that the detecting means comprises a device for furnishing an electrical signal corresponding to the angle of rotation of the center of the anti-inclination or stabilizer bar, an electronic means transmits information to the actuators when the signal exceeds a predetermined threshold value. The detecting means comprises a casing mounted on the chassis and having a lever arm driven in rotation by a linkage means connected to a lever rigidly attached to the center of the stabilizer bar. This enables the electrical detecting component of the detector to be a basic component such as a rheostat or similar transducer which provides an electrical signal of a value proportional to the extent of angular movement of the detector lever arm, without any loading of the stabilizer bar.

There is described hereafter, a non-limiting example of an embodiment of the invention, with reference to the drawing.

BRIEF DESCRIPTION OF THE DRAWING

The single FIGURE of the drawing shows the suspension schematically.

DETAILED DESCRIPTION

With reference to the drawing, there is an anti-inclination or stabilizer bar 1 which is pivotally mounted with respect to the chassis 2 of the vehicle. The bar 1 is generally U-shaped having elbow like or angled end portions which are articulated at 3a and 3b to the arms 4a and 4b, respectively. The arms 4a and 4b are mounted for pivotal movement with respect to the chassis 2 about a longitudinal axis, and are connected by ball or swivel joints 5a and 5b to the respective steering knuckles or support spindles 6a and 6b for the wheels 7a and 7b. The support spindles 6a and 6b are connected to the chassis 2 by the suspension elements 8a and 8b.

A lever 9 is fixed to the center of the stabilizer bar 1, so that the lever 9 is in the plane of the longitudinal axis of the vehicle, and extends rearwardly from the stabilizer bar, as show in the drawing. The lever 9 is fixed rigid in torsion to one of the ends of a shaft 10 having its other end mounted in a bearing 11 fixed to the chassis. Fixed to shaft 10, near the bearing 11, is a bar 12 which is connected by a link 13 and swivel or ball joints 14 and 15 to a control or input lever arm 16 of a detector 17 whose casing is secured to the chassis 2 at a location offset from the center of the vehicle.

The detector 17 detects the mean algebraic value of movements or deflections of the front wheels, that is to say, the pumping or vertical movement of the chassis. It is, on the other hand, unaffected by and insensitive to rolling or tilting movements about the longitudinal axis of the vehicle.

The detector 17 provides a signal to an electronic calculator 18 which receives in addition a signal coming from a speed detector 19, and a signal from a detector 20 of the angle and turning speed of the steering wheel 21. The calculator 18 provides the control signals to the actuators 22a and 22b, of the known type, to change the damping or firmness of the suspension elements 8a and 8b.

When the mean value of the deflections of the two wheels 7a and 7b exceeds a certain threshold value, as a function of the speed of the vehicle as well as the angle and the speed of turning movement of the steering wheel, the calculator 18 provides signals to the actuators 22a and 22b to render the suspensions 8a and 8b more or less firm.

It is to be understood that the present invention is not limited to the embodiment described and shown, but also covers variations. Thus, the shaft 10 can be eliminated, the detector 17 being positioned in the immediate vicinity of the median longitudinal plane of the vehicle, but the detector itself must then be carefully mounted since it is then located in a space already occupied by other components such as the motor or the gear box.

We claim:

1. In a suspension for an automotive vehicle having a chassis and a system of damping variable as a function of parameters such as the speed, the height, and steering angle of the wheels, the suspension having suspension arms connected to axles for front wheels of the vehicle, an anti-inclination bar connected to the suspension arms for the front wheels, and actuators for varying the damping of suspension elements connected to the front wheels, the improvement comprising, a lever secured to the center of the anti-inclination bar to pivot through an angle corresponding to the angular rotation of the center of the bar, detecting means for detecting the height of the vehicle and comprising a casing mounted on the chassis of the vehicle and having an input arm adapted to be driven in rotation, means connecting said lever to said input arm to turn said input arm in response to pivoting of said lever, said detecting means comprising a detector for providing an electrical signal corresponding to the angle of rotation of the center of the anti-inclination bar, and electronic means for transmitting control information to said actuators in response to an electrical signal from said detector which exceeds a predetermined threshold value.

2. A suspension according to claim 1 wherein, said casing of said detecting means is secured to a side of the vehicle chassis, and said means connecting said lever to said input arm comprises, a shaft relatively rigid in torsion having an end fixed to said lever and an end mounted in a bearing on said chassis, and a bar fixed to the shaft near the bearing and connected to the input arm of the detecting means by a link.

3. A suspension according to claim 2 wherein, said link comprises a rod, a first swivel joint connecting one end of said rod to said input arm of the detecting means, and a second swivel joint connecting the other end of said rod to said bar.

* * * * *